United States Patent [19]

Drainville

[11] Patent Number: 5,574,396
[45] Date of Patent: Nov. 12, 1996

[54] MICRO-POWER VORTEX ISOLATOR CIRCUIT

[75] Inventor: Michael G. Drainville, Manville, R.I.

[73] Assignee: The Foxboro Company, Foxboro, Mass.

[21] Appl. No.: 322,641

[22] Filed: Oct. 13, 1994

[51] Int. Cl.⁶ ........................................................ G06G 7/64
[52] U.S. Cl. .............................. 327/337; 327/91; 327/342
[58] Field of Search ........................ 73/861.22; 324/118, 324/111, 123 R; 327/94, 91, 177, 337, 342

[56] References Cited

U.S. PATENT DOCUMENTS

| | | | |
|---|---|---|---|
| 4,191,929 | 3/1980 | Max et al. | 330/10 |
| 4,400,637 | 8/1983 | Klar et al. | 327/336 |
| 4,429,281 | 1/1984 | Ito et al. | 327/337 |
| 4,454,423 | 6/1984 | Koob | 327/342 |
| 4,463,612 | 8/1984 | Thompson . | |
| 4,479,175 | 10/1984 | Gille et al. | 363/41 |
| 4,496,858 | 1/1985 | Smith | 327/337 |
| 4,669,037 | 5/1987 | Bobry . | |
| 4,678,937 | 7/1987 | Price . | |
| 4,747,035 | 5/1988 | Bobry | 363/24 |
| 4,835,486 | 5/1989 | Somerville . | |
| 5,187,446 | 2/1993 | Daly . | |

Primary Examiner—Timothy P. Callahan
Assistant Examiner—Jeffrey Zweizig
Attorney, Agent, or Firm—Clare Hartnett; Jules Jay Morris; David Barron

[57] ABSTRACT

An analog isolation circuit for providing electrical isolation between interrelated electrical circuitry contained within a vortex flowmeter. The circuit provides a low power and low cost solution to the problem of ground isolation presented in flowmeters utilizing grounded sensors which generate low frequency sinusoidal signals. A pair of clock-controlled analog switches couples the voltage difference between two successive samples of an analog signal across an isolation barrier. The operation of the switches at a low frequency rate and with a short sampling interval while utilizing a low magnetizing current preserves the magnitude of the input waveform while consuming approximately 1 mW of power.

5 Claims, 4 Drawing Sheets

$\tau$

MICRO-POWER VORTEX ISOLATOR CIRCUIT

BACKGROUND

1. Technical Field

This invention relates to industrial process control instrumentation, more particularly, for a method and apparatus for electrically isolating interrelated vortex electronic circuitry.

2. Background Art

It has been known for many years that vortices are developed in a fluid flowing past a non-streamlined obstruction. It also has been known that with certain arrangements vortices are developed by alternately shedding at regular intervals from opposite edges of the obstruction to form corresponding rows of vortices. Such vortices establish a so-called von Karman "vortex street," which is a stable vortex formation consisting of two nearly-parallel rows of evenly-spaced vortices travelling with the flow stream.

In a von Karman vortex street, the vortices of one row are staggered relative to those of the other row by approximately one-half the distance between consecutive vortices in the same row. The spacing between successive vortices in each row is very nearly constant over a range of flow rates, so that the frequency of vortex formation is correspondingly proportional to the velocity of the fluid. Thus, by sensing the frequency of vortex formation it is possible to measure the fluid flow rate. Devices for that purpose are often referred to as vortex meters or vortex flowmeters.

Various types of vortex meters have been available commercially for a number of years. Typically, these vortex meters comprise a vortex-shedding body mounted in a flow tube together with a sensor for detecting the frequency of vortex formation. Sensors used to detect the vortices often include diaphragms which fluctuate in response to alternating differential pressure variations generated by the vortices. The pressure applied to the diaphragms is transferred to a sensor or transducer which then produces electronic signals responsive to differential pressure applied to the diaphragms. This differential pressure measurement is used, in turn, to measure the frequency of vortex formation and ultimately the fluid flow rate or velocity.

Typically, the sensor produces an AC sinusoidal voltage signal which is linearly proportional to the volumetric flow rate. This signal is conditioned and amplified for transmission by electronic circuitry located in a housing mounted integral with the flowmeter body. The electrical components in the housing transforms the sinusoidal signal to a square wave pulse train of constant voltage amplitude and having a frequency equal to the vortex shedding frequency. This signal can then be transformed to a 4 to 20 mA dc signal that is directly proportional to the frequency of the square-wave signal, and in turn, directly proportional to the frequencies of the vortices sensed by the sensor. The final output signal can be available in either pulse form with each pulse representing a discrete quantity of fluid from which the volumetric total can be derived or, optionally, as a 4 to 20 mA dc signal for flow rate recording or control.

Often, the vortex sensing element produces signals which are referenced to a local earth ground, that being, a signal having a ground common to the meter body and the process piping. In these cases, an electrical isolation barrier is designed into the vortex meter electronics to electrically isolate the circuitry sharing the sensor ground from the electronics sharing the transmitter power supply ground. This is necessary to break ground loops which can exist when the transmitter is located a considerable distance from the power supply.

The nature of the vortex flowmeter imposes additional design constraints on the electrical isolation barrier. First, the circuitry requires low power consumption in order to adhere to industrial instrumentation standards for generating the 4–20 mA signal. Preferably, micro-power consumption in the range of 0–10 mW is desired. Second, in hostile environments, intrinsic safety standards need to be met. Examples of such standards include, but are not limited to, the Factory Mutual System Standard 3610 for Hazardous Locations and the CENELEC Intrinsic Safety Standard For Electrical Apparatus For Potentially Explosive Atmospheres, EN50020. These standards impose certain physical as well as electrical isolation requirements which ensure that even under fault conditions, the electronics are incapable of causing a spark or thermal effect which could ignite a flammable mixture or combustible material. Furthermore, to reduce the cost of the flowmeter, it is desirable to utilize low cost electrical components and to reduce the complexity of the electrical circuitry. It is also advantageous to reduce the complexity of the electrical circuitry since industrial instrumentation standards limit the amount of space that can be used for packaging the electronics. Therefore, it is desirable for an isolation barrier designed for use in a vortex flowmeter to consume low power, adhere to intrinsic safety standards, utilize less circuit board area, be comprised of low cost components, and to contain a minimum number of electrical isolation barrier crossings.

Various analog isolation devices are well known in the art utilizing electromagnetic coils, capacitive isolation techniques, and optical couplers. Monolithic integrated circuits utilizing these techniques consume large amounts of power, typically greater than 10 mW, which makes them less suitable for industrial instrumentation. Another type of analog isolation technique is one which performs the signal conditioning of the raw sensor signal, and then transforms the signal to a square-wave pulse signal which is then passed across an isolation barrier. This technique has several disadvantages. First, isolation barriers used in this technique are usually positioned at a later stage in the processing. This may increase the number of barrier crossings when more efficient signal conditioning techniques are employed. Further, the waveform's spectral information is lost thereby limiting the use of the signal in further signal processing stages. Accordingly, there has existed a need for an improved isolation barrier which not only isolates the different electrical subcomponents used in generating the final output signal from a vortex flowmeter, but also adheres to the constraints of low power utilization, low cost component construction, intrinsic safety requirements, and which minimizes the number of barrier crossings.

It is an object of the present invention to provide a circuit isolation technique for isolating a grounded low frequency AC sinusoidal signal from electronic circuitry having a different ground.

A further object of the present invention is to provide a circuit isolation technique for converting an unconditioned AC sinusoidal signal at an initial ground potential to a representative AC sinusoidal signal at a second ground potential.

Another object is to provide a circuit isolation technique of the type described which is of low cost component construction and which requires minimal power consumption.

Another object is to provide a circuit isolation technique of the type described which minimizes the number of barrier crossings required to carry over the initial vortex signal.

Another object is to provide an infallible circuit isolation technique of the type described which adheres industrial intrinsic safety requirements.

Other general and specific objects and advantages of this invention will be apparent and evident from the accompanying drawings and the following description.

SUMMARY OF THE INVENTION

A circuit for providing electrical isolation between interrelated electrical circuitry contained within an industrial flowmeter that is used to generate a signal representative of the process flow rate and the scaled volumetric total flow is herein disclosed.

A vortex sensor signal, representative of the vortex shedding frequency of a process flow, is applied to a high impedance preamplifier which is coupled to a clock-controlled first analog switch. The first analog switch is coupled to the primary winding of a transformer. There it is transformed to the secondary winding of the transformer and sampled by the sampling capacitor through a second clock-controlled analog switch. The action of the second clock signal allows the charging of the sampling capacitor to the voltage at the charge amplifier output when both switches are on. Once sampled, the sampling capacitor is discharged through a passive low pass circuit through a third clock-controlled analog switch, which is 180 degrees out of phase with the clocks controlling the first and second switches. The resulting signal is then transmitted to an integrating buffer stage which serves to further filter the switching frequency components and also acts as a buffer for transmission to further signal processing stages.

BRIEF DESCRIPTION OF THE DRAWINGS

The foregoing and other objects, features and advantages of the invention will be apparent from the following more particular description of the preferred embodiment of the invention, as illustrated in the accompanying drawings in which like reference characters refer to the same elements throughout the different views. The drawings are schematic representations of control elements, emphasis being placed on illustrating the principles of the invention.

DESCRIPTION OF THE ILLUSTRATED EMBODIMENT

A circuit for providing electrical isolation between interrelated electrical circuitry contained within an industrial flowmeter that is used to generate a signal representative of the flow rate and the scaled volumetric total flow is herein disclosed.

Figure 1:
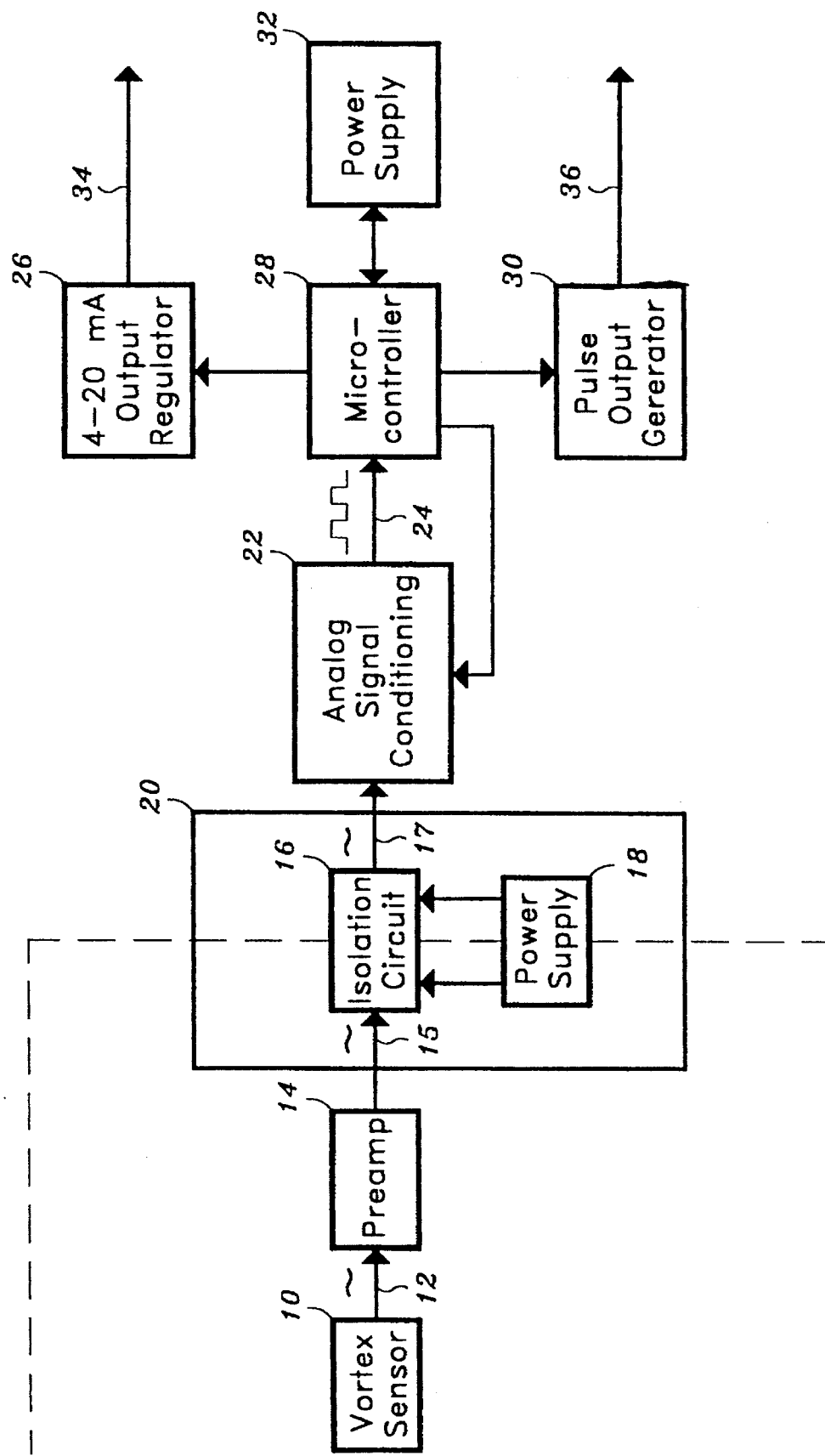
FIG. 1 is a functional block diagram of the vortex isolation circuit embodying the invention.

Referring more particularly to the drawings and initially to FIG. 1, there is shown the basic components involved in generating an electrical output signal representative of the process flow rate. As is well known in the art, a vortex shedding flowmeter can be prepared by placing a non-streamlined obstruction in the fluid flow together with a sensor for detecting the frequency of vortex formation. The vortex sensor, 10, generates an ac sinusoidal signal, 12, with frequencies ranging from 0.5Hz to 3 kHz. The electronic circuitry which generates the vortex sensor signal is grounded at an initial or primary voltage potential. The sensor input signal, 12, is then buffered and amplified by a standard preamplifier, 14, generating input signal 15. The unconditioned input signal, 15, is then transformed by isolation device, 20, to a representative sinusoidal signal, 17, at a second ground potential. The signal is transmitted further to an analog signal conditioning device, 22, which filters out noise signals associated with signal, 17, resulting from acoustic, electrical, and mechanical vibrations existing in the ambient surroundings in flow measuring environments. Analog signal conditioning device, 22, also transforms the sinusoidal input signal, 17, into a square-wave pulse train, 24, of constant voltage amplitude and having a frequency equal to the vortex shedding frequency. Square-wave pulse signal, 24, is processed further by 4–20 mA output regulator, 26, generating a 4 to 20 mA dc signal, 34, which can be used by an instrumentation control system for flow rate recording or control. Additionally, the square-wave pulse signal, 24, can be further conditioned and transmitted by pulse output generator, 30, as scaled pulse signal, 36. Analog signal conditioning unit, 22, the 4–20 mA output regulator, 26, and pulse output generator, 30, are all under the control of micro-controller, 28, which utilizes power supply 32 grounded at a second voltage potential. Therefore, in order to eliminate electrical and electromagnetic interference generated by the resultant ground loops, isolation device 20 serves as a barrier isolating the ground potential of vortex sensor signal, 12, from power supply, 32. Any such ground loops could seriously impair the integrity of the vortex flow rate measurement.

Figure 2:
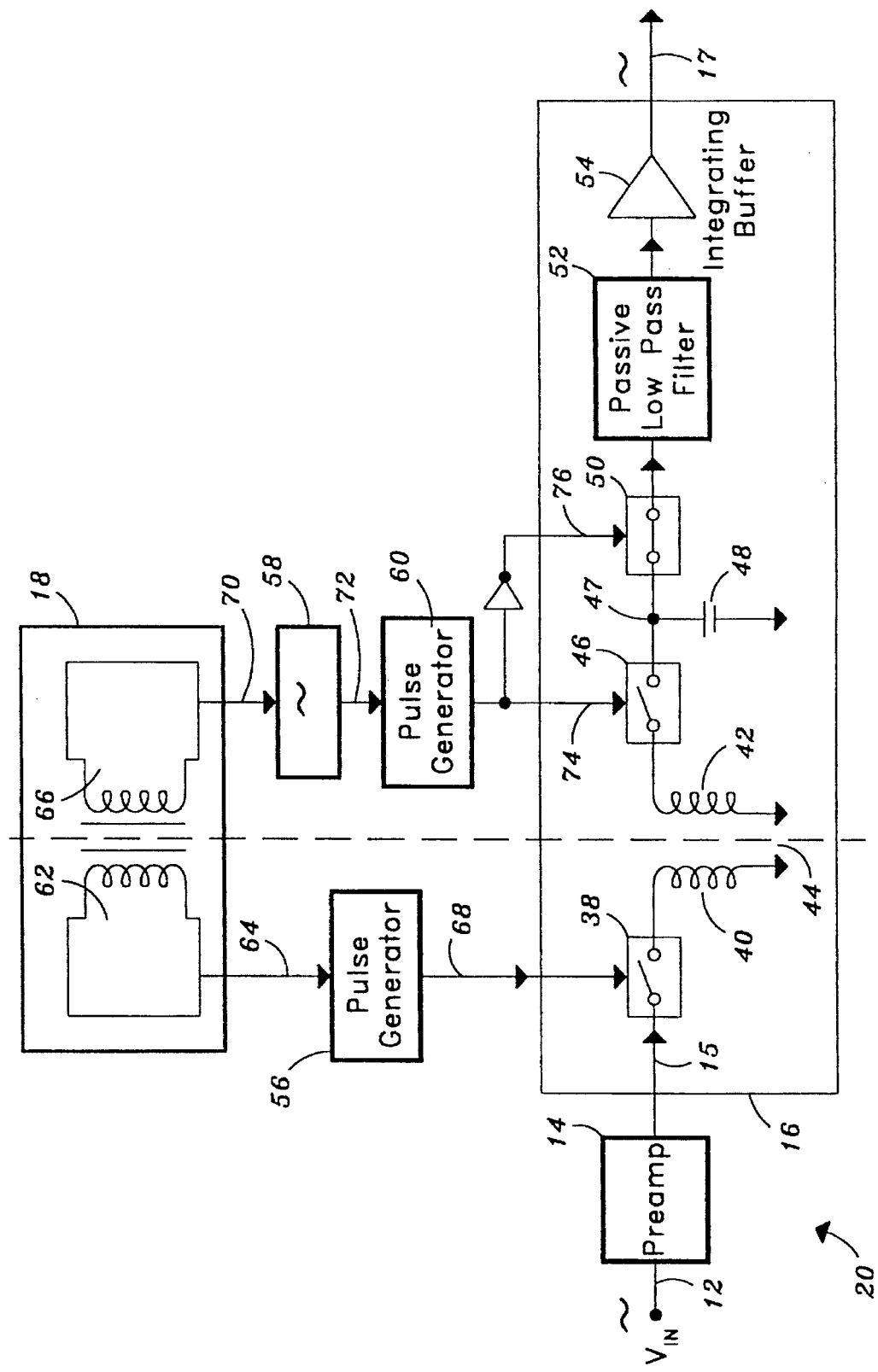
FIG. 2 is a circuit diagram of the vortex isolation circuit according to the preferred practice of the invention.
Figure 3A:
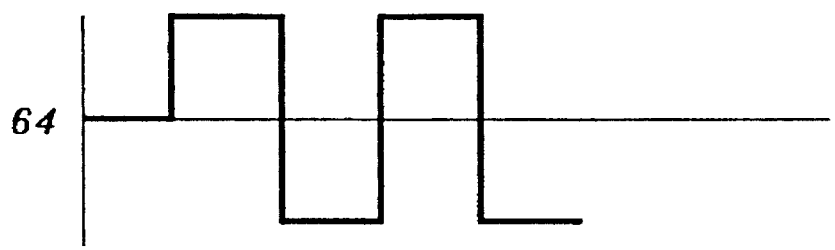
FIG. 3 illustrates the phasing of the control signals used to trigger the analog switches shown in FIG. 2.
Figure 3B:
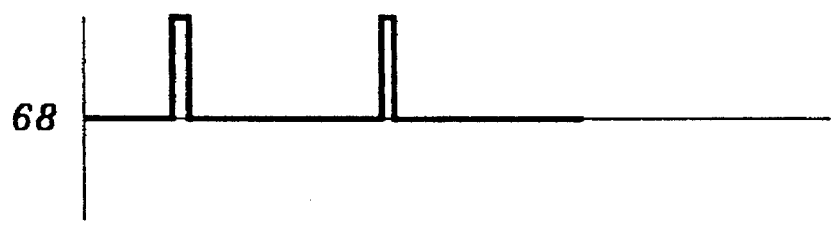
Figure 3C:
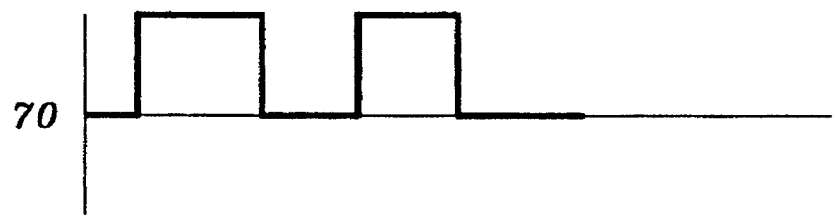
Figure 3D:
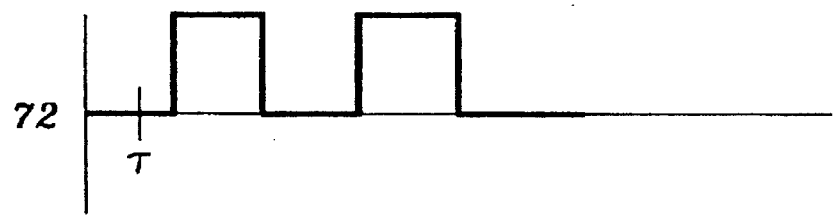
Figure 3E:
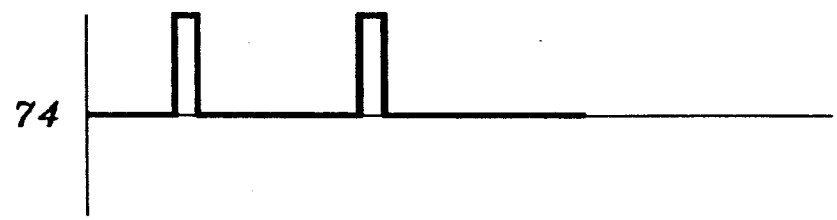
Figure 3F:
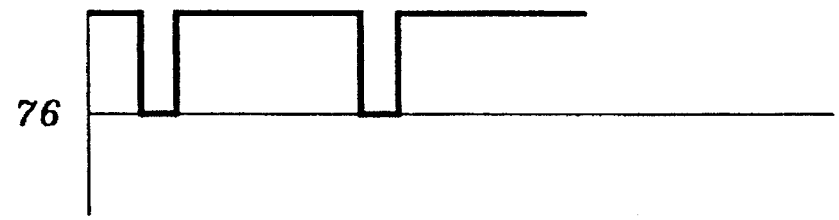

FIG. 2 depicts the basic components of isolation device 20. Referring to FIG. 2, isolation device 20 consists of an isolation circuit 16 and an isolated power supply, 18. Isolation circuit, 16, consists of a transformer, 44, having a primary winding, 40, and a secondary winding, 42, and a core magnetically coupling the primary and secondary windings. A first analog switch, 38, is coupled to the primary winding, 40, and a second analog switch, 46, is coupled to the secondary winding, 42. Switch pairs, 38 and 46 are used to synchronously control the sampling of the input pulses across the transformer. The analog switches can be preferably CMOS analog switches such as Motorola switches HC 4316. Sampling capacitor, 48, is coupled to a second analog switch, 46, and used to store the sampled pulses. Sampling capacitor, 48, is chosen to be of a sufficiently small capacitance, less than 5,000 pf, so as to minimize the electrical load. Preferably, the value of sampling capacitor, 48, can be 680 pf. Sampling capacitor, 48, is coupled to a third analog switch, 50, used to control the discharge of sampling capacitor, 48, to a passive low pass filter, 52. Passive low pass filter, 52, filters out noise signals thereby preserving the original waveform. Passive low pass filter, 52, can be a low pass RC filter, or alternatively any other type of filtering device which and is coupled to integrating buffer, 54, which provides additional filtering, gain, and buffers the signal for the next signal conditioning stage.

Isolated power supply, 18, can be preferably a DC/DC converter having a primary side, 66, and a secondary side, 62. DC/DC converter is well known in the electrical arts and will not be discussed in detail herein. The primary transformer, 66, generates a first clock pulse signal, 70, which can have preferably a 62.5 kHz+3.3 volt 50% duty cycle waveform. The secondary transformer, 62, generates a second clock pulse signal, 64, which can have preferably 62.5 kHz±2.6 volt 50% duty cycle waveform. However, the DC/DC converter is not limited to these clock pulse specifications. Others may be used so long as the clock pulse rate is less than 100 kHz. In order to synchronize both clock pulse signals 64 and 70, first clock pulse signal, 70, is delayed by approximately 100 ns, at synchronization delay 58, producing signal 72 synchronized with signal 64. Both clock pulse signals are further conditioned by standard CMOS logic contained in the appropriate pulse generators, 56 and 60, to produce approximately a 1 us wide 62.5 kHz pulse train. These resultant clock pulse streams are used to control the sampling of the input signal 15. Pulse generator, 60, generates a clock pulse stream, 74, which controls switch, 46, as well as clock pulse stream, 76, which is the inverted (by invertor 61) counterpart that controls switch, 50. Similarly, pulse generator, 56, generates a 1 us wide 62.5 kHz clock pulse stream, 68, which is used to control switch, 38. It should be noted that the invention is not limited to a 1 us wide 62.5 kHz clock pulse stream. A clock pulse stream at a frequency rate of less than 100 k Hz and at a pulse width of less than 10% of the sampling rate is suitable.

The operation of isolation device, 20, will now be discussed in detail. Referring to FIG. 2, vortex sensor signal, 12, an ac sinusoidal signal having an approximate frequency range between 0.5 Hz and 3 k Hz, is transmitted to preamplifier, 14. Preamplifier, 14, serves as a high impedance buffer and amplifier, generating amplified signal, 15. Signal 15 is regularly and periodically sampled by the operation of switches 38 and 46 with the resultant signal applied to a sampling capacitor, 48, coupled to the secondary winding of transformer 44. The transformer action results in an essentially identical signal appearing at the secondary winding of the transformer although the magnitude of the signal may be increased or decreased depending upon the transformer turns ratio. Preferably, the turns ratio, secondary to primary, can be 1.4:1.

Signal 15 can be sampled at a high rate, approximately a minimum of 20 times the maximum sensor output frequency, which occurs at 3 kHz. Sampling at this rate preserves most of the magnitude information and all of the spectral content of the signal within the band of interest. Narrow time slices, approximately less than 10% of the duty cycle of the clock pulse or preferably at 1 us pulses, of the input signal are passed across the transformer. This narrow time slice requires a low magnetizing current of less than 50 uA, preferably less than 10 uA. Furthermore, sampled pulses represent the voltage difference between consecutive pulses thereby further conserving power.

Figure 4A:
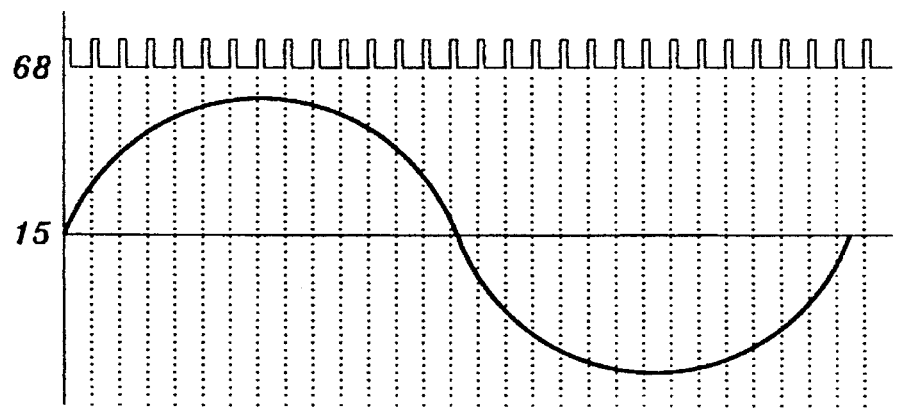
FIG. 4 illustrates the waveforms produced by the circuit of FIG. 2.
Figure 4B:

The sampling of input signal, 15, is performed by switches 38, 46, and 50 which are controlled by means of a 62.5 kHz clock pulse derived from the switching frequency of the DC/DC Converter or isolation power supply 18. The control phasing is illustrated in FIG. 3 and the waveforms produced are illustrated in FIG. 4. Referring to FIGS. 2, 3, and 4, switches 38 and 46 operate synchronously, and switch 50 operates inversely with switches 38 and 46. At the rising edge of clock pulses 68 and 74, switches 38 and 46 close for approximately 1 us in which time sampling capacitor 48 is charged to the approximate voltage of signal 15. The increase in charge in sampling capacitor 48 is proportional to the voltage difference from the previous sampled pulse, 47, while also minimizing the magnetizing current required for passing the magnitude of the sampled pulse across the barrier. The magnitude of the sampled pulse is a function of the charging time of sampling capacitor, 48, the pulse width, 1 us, the turns ratio, 1:1.4, and the droop across the transformer. On the falling edge of clock pulses 68 and 74, or the rising edge of clock pulse 76, the sampled pulse is discharged into the passive low pass filter, 52. Passive low pass filter 52 strips out the clock pulse frequency spectral component thereby preserving the original waveform. This waveform is then transmitted to integrating buffer, 54, which provides additional filtering, gain, and buffers the signal for the next conditioning stage.

A circuit for providing electrical isolation between interrelated electrical circuitry contained within a vortex flowmeter that is used to generate a signal representative of the process flow rate has been disclosed. The circuit achieves low power consumption, adheres to intrinsic safety standards, and consists of low priced components costing approximately as little as $5.00. The circuit consumes approximately a maximum of 1.5 mW of power being within the micro-power range of 0–10 mW. This micro-power consumption is achieved by utilizing a 62.5 kHz carrier signal, by sampling the input signal at pulse widths of 1 us thereby minimizing the magnetizing current required for passing the magnitude of the sampled pulse across the isolation barrier, and by transmitting only the difference in the vortex signal from sample to sample. The circuit achieves electrical isolation by transforming an analog sinusoidal voltage signal representative of the vortex shedding frequency of a process flow at an initial ground into a representative signal at a second ground potential while preserving the magnitude and spectral information of the original waveform. The placement of the isolation barrier at the initial stage in the signal processing phase minimizes the number of barrier crossings required by the additional interrelated electronic components.

Although the preferred embodiment of the invention has been described hereinabove in detail, it is desired to emphasize that this is for the purpose of illustrating the invention and thereby to enable those skilled in this art to adapt the invention to various different applications requiring modifications to the apparatus described hereinabove; thus, the specific details of the disclosures herein are not intended to be necessary limitations on the scope of the present invention other than as required by the prior art pertinent to this invention.

I claim:

1. A micro-power isolation circuit comprising:
   (a) an input circuit having an electrical output, for sampling an input analog signal to produce a first sampled signal, said input circuit sampling at a frequency less than 100 kHz and at a sampling interval of less than 10% of the sampling frequency;
   (b) an output circuit having an electrical input and electrically isolated from said input circuit, said output circuit generating a second sampled signal derived from the voltage difference between two successive samples of said input signal; and
   (c) means for coupling said first sampled signal to said input of said output circuit, said coupling means maintaining electrical isolation between said input circuit and said output circuit.

2. A circuit as in claim 1 wherein said means for coupling said first sampled signal to said input of said output circuit, comprises an isolation transformer having a primary winding, a secondary winding, and a core magnetically coupling the primary and secondary windings, said primary winding connected to said electrical output of said input circuit, said secondary winding connected to said electrical input of said output circuit.

3. A circuit as in claim 1 wherein said input analog signal represents the vortex shedding frequency of a process fluid.

4. A micro-power analog isolation circuit comprising:
 a) sampling means for capturing a magnitude of an input signal, said sampling means generating a sampled signal at a sampling frequency of less than 100 kHz and at a sampling interval less than 10% of the sampling frequency;
 (b) capacitance means for storing magnitudes of the sampled signal, said capacitance means charged to the voltage difference from a preceding sampled signal and the sampled signal, said capacitance means electrically isolated from said sampling means;
 (c) a transformer having a primary winding and a secondary winding and a core magnetically coupling the primary and secondary windings, said transformer used for transforming the sample of the input signal at a first ground potential to a second ground potential, said sampling means connected to the primary winding of said transformer, and said capacitance means coupled to the secondary winding of said transformer;
 (d) filtering means coupled to said capacitance means, for filtering the sampled signal thereby generating an output sinusoidal signal at a second ground potential having an identical waveform as the input signal; and
 (e) control means for generating a first clock pulse signal at said sampling frequency and at said sampling interval, for synchronously controlling said sampling means and the coupling of said capacitance means, said control means generating a second clock pulse signal for discharging the sampled signal from said capacitance means to said filtering means, said second clock pulse signal sampled at a rate of less than 100 kHz and 180° out of phase with the first clock pulse signal.

5. A circuit for transforming an input analog sinusoidal signal having a first ground potential to an output analog sinusoidal signal at a second ground potential, the input signal representing a vortex shedding frequency of a process fluid, said circuit comprising:
 (a) a transformer having a primary winding and a secondary winding and a core magnetically coupling the primary and secondary windings, said transformer used for changing said first ground potential of the input signal to said second ground potential;
 (b) a first switching element, coupled to the primary winding of said transformer, for generating a sampled signal of the input signal, said first switching element sampling at the rate of less than 100 kHz and at a pulse width of less than 10% of the sampling rate;
 (c) a capacitance element, coupled by said transformer to the sampled signal of said first switching element through the secondary winding of said transformer, said capacitance element charged to the voltage difference between two successive sample signals, and said capacitance element electrically isolated from said first switching element;
 (d) a second switching element, coupled to said capacitance element, for periodically connecting said capacitance element to said secondary winding of said transformer in order to charge said capacitance element;
 (e) a power source having a primary side and a secondary side for generating a first clock pulse signal coupled to the secondary side and a second clock pulse signal coupled to the primary side, wherein the first and second clock pulse signals have a 50% duty cycle waveform of less than 100 kHz;
 (f) a first control means coupled to the secondary side of said power source and to said first switching element for generating a third clock pulse signal having said sampling rate and said pulse width for controlling said sampling rate and said sampling pulse width of said first switching element;
 (g) a delay means coupled to the primary side of said power source for synchronizing the second clock pulse signal with the first clock pulse signal;
 (h) a second control means coupled to the primary side of said power source and said delay means for generating a fourth clock pulse signal having a frequency of less than 100 kHz and a pulse width of less than 10% of the frequency, said second control means used for controlling the coupling of the sampled signal to said capacitance element and wherein said first and second control means operate synchronously;
 (i) a low pass filter means, coupled to said capacitance element, for filtering out frequency spectral components from the sampled signal thereby generating an output signal with an identical waveform as the input signal but at the second ground potential;
 (j) a third switching element, coupled to said capacitance element and said low pass filter means for controlling the discharge of the capacitance element into said low pass filter means, where said third switching element operates inversely with said first and second switching elements; and
 (k) an integrating buffer, coupled to said low pass filter means, for providing additional filtering of the output signal and for buffering the output signal for further signal processing.

\* \* \* \* \*